(12) United States Patent
Zhang et al.

(10) Patent No.: US 10,348,406 B2
(45) Date of Patent: Jul. 9, 2019

(54) ELECTRICAL INTERFACE MODULE

(71) Applicant: HISENSE BROADBAND MULTIMEDIA TECHNOLOGIES, LTD., Qingdao (CN)

(72) Inventors: Chungang Zhang, Qingdao (CN); Shu Liu, Qingdao (CN); Liang Shi, Qingdao (CN); Hua Zhang, Qingdao (CN)

(73) Assignee: Hisense Broadband Multimedia Technologies, Ltd., Tortola (VG)

( * ) Notice: Subject to any disclaimer, the term of this patent is extended or adjusted under 35 U.S.C. 154(b) by 379 days.

(21) Appl. No.: 15/198,041

(22) Filed: Jun. 30, 2016

(65) Prior Publication Data

US 2017/0078021 A1    Mar. 16, 2017

(30) Foreign Application Priority Data

Sep. 16, 2015 (CN) .......................... 2015 1 0589882

(51) Int. Cl.
| | |
|---|---|
| *G01M 11/00* | (2006.01) |
| *H04B 10/25* | (2013.01) |
| *H04B 10/27* | (2013.01) |
| *H04B 10/40* | (2013.01) |

(Continued)

(52) U.S. Cl.
CPC ..... *H04B 10/2504* (2013.01); *H04B 10/0731* (2013.01); *H04B 10/27* (2013.01);
(Continued)

(58) Field of Classification Search
CPC ................ H04B 10/2504; H04B 10/27; H04B 10/0731; H04B 10/40; H04B 10/0771;
(Continued)

(56) References Cited

U.S. PATENT DOCUMENTS 7,447,437 B2 *  11/2008  Schunk ................. H04B 10/40
                                                              385/88
8,335,235 B2 *  12/2012  Davis .................. H04L 12/2885
                                                              370/392
(Continued)

FOREIGN PATENT DOCUMENTS

| CN | 101902280 A | 12/2010 |
| CN | 102497596 A | 6/2012 |
| CN | 102546010 A | 7/2012 |

OTHER PUBLICATIONS

Office Action from Chinese Application No. 201510589882.4 dated Jun. 29, 2018 (5 pages).

*Primary Examiner* — Brian T O Connor
(74) *Attorney, Agent, or Firm* — Brinks Gilson & Lione (57) ABSTRACT

This disclosure provides an electrical interface module including a signal processor, a switch, and a connection component, wherein the signal processor includes a first interface, a second interface, and a third interface; the first interface and the second interface of the signal processor are connected with the connection component through the switch, and configured to output differential signals; the third interface of the signal processor is connected with the switch, and configured to output an enable signal; and the switch is configured to be controlled by the enable signal to be closed so that the differential signals are output through the connection component.

13 Claims, 8 Drawing Sheets

(51) Int. Cl.
  *H04L 12/24* (2006.01)
  *H04L 12/26* (2006.01)
  *H04Q 11/00* (2006.01)
  *H04B 10/071* (2013.01)
  *H04B 10/073* (2013.01)
  *H04B 10/077* (2013.01)

(52) U.S. Cl.
  CPC ..... *G01M 11/3136* (2013.01); *G01M 11/3145* (2013.01); *H04B 10/071* (2013.01); *H04B 10/0771* (2013.01); *H04B 10/0775* (2013.01); *H04B 10/40* (2013.01); *H04L 41/145* (2013.01); *H04L 43/50* (2013.01); *H04Q 11/0067* (2013.01)

(58) Field of Classification Search
  CPC .............. H04B 10/071; H04B 10/0775; H04Q 11/0005; H04Q 2011/0013; H04Q 11/0067; H04L 41/145; H04L 43/50; G01M 11/3136; G01M 11/3145
  See application file for complete search history.

(56) References Cited

U.S. PATENT DOCUMENTS

| | | | | |
|---|---|---|---|---|
| 8,433,206 B2* | 4/2013 | Kim | .................. | H04B 10/6933 398/209 |
| 8,805,183 B2* | 8/2014 | Dvir | .................... | H04B 10/071 398/10 |
| 9,312,953 B2* | 4/2016 | Soto | .................. | H04B 10/0775 |
| 9,379,813 B2* | 6/2016 | Prause | ............. | H04B 10/07955 |
| 9,673,897 B2* | 6/2017 | Prause | ............... | H04B 10/0793 |
| 9,948,400 B2* | 4/2018 | Yuda | ...................... | H04B 10/54 |
| 10,171,179 B2* | 1/2019 | Zhang | .................... | G02B 6/428 |
| 2005/0276607 A1* | 12/2005 | Schunk | .................. | H04B 10/40 398/135 |
| 2009/0324228 A1* | 12/2009 | Bernard | ................ | H04J 3/0682 398/79 |
| 2011/0129233 A1* | 6/2011 | Kim | ................ | H04B 10/69 398/202 |
| 2011/0268443 A1* | 11/2011 | Adler | ................ | H04Q 11/0067 398/58 |
| 2012/0051748 A1* | 3/2012 | Hotta | ................... | H04B 10/272 398/58 |
| 2013/0202290 A1* | 8/2013 | Dvir | .................. | H04B 10/071 398/21 |
| 2013/0202300 A1* | 8/2013 | Dvir | .................. | H04Q 11/0066 398/58 |
| 2014/0159795 A1* | 6/2014 | Scouten | .............. | H04L 25/0292 327/333 |
| 2014/0219656 A1 | 8/2014 | Lawson et al. | | |
| 2015/0188627 A1* | 7/2015 | Yuda | .................. | H04B 10/502 398/30 |
| 2018/0359028 A1* | 12/2018 | Katayama | ............... | H04L 12/44 |

* cited by examiner

ELECTRICAL INTERFACE MODULE

CROSS-REFERENCE TO RELATED APPLICATION

This application claims the benefit and priority of Chinese Patent Application No. 201510589882.4 filed Sep. 16, 2015. The entire disclosure of the above application is incorporated herein by reference.

FIELD

This disclosure relates to the field of optical communications, and particularly to an electrical interface module.

BACKGROUND

This section provides background information related to the present disclosure which is not necessarily prior art.

Since the technology of Fiber To The Home (FTTH) emerged, it has been regarded as the inevitable development trend of access networks in the future, and expected to be the ultimate solution to a broadband access. Particularly along with an increasing network speed, there are rapidly growing demands for access network office end Optical Line Terminal (OLT) optical modules, and also for office end system devices. From the perspective of an access network office end device manufacturer, the office end devices have to be tested in a complicated environment at a high cost before they are shipped from their factories, and this test cost may not be neglectable particularly if there is a significant demand in the market.

Figure 1:
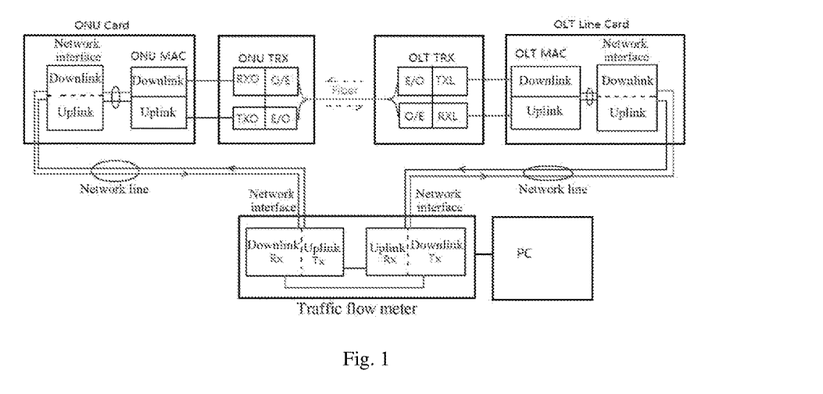
FIG. 1 is a schematic structural diagram of an OLT device being tested in the prior art.

As illustrated in FIG. 1, in an existing solution to a test on an office end device, the office end device accesses an existing OLT device through an all-in-one FTTH user end Optical network Unit (ONU) device, and then a traffic flow meter is controlled by a computer to test interconnection between the ONU and the OLT. In this way, the office end device has to be tested by connecting the OLT optical module with the user end (ONU) device through a number of optic fibers, each of which is inserted and drawn out repeatedly for each round of test, thus resulting in frequent mis-operations and needing to correct in a time-consuming manner.

In summary, the existing solution to a test on an OLT device has to build a complicated environment, and may test the OLT device inefficiently, thus wasting a valuable period of time for production and testing, and increasing the unwanted cost.

SUMMARY

This section provides a general summary of the disclosure, and is not a comprehensive disclosure of its full scope or all of its features.

An embodiment of this disclosure provides an electrical interface module including a signal processor, a switch, and a connection component, wherein:

the signal processor includes a first interface, a second interface, and a third interface;

the first interface and the second interface of the signal processor are connected with the connection component through the switch, and configured to output differential signals;

the third interface of the signal processor is connected with the switch, and configured to output an enable signal; and the switch is configured to be controlled by the enable signal to be closed so that the differential signals are output through the connection component.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

An electrical interface module according to an embodiment of this disclosure includes a signal processor, a switch, and a connection component, where the signal processor includes a first interface, a second interface, and a third interface, the first interface and the second interface of the signal processor are connected with the connection component through the switch, and configured to output differential signals, and the third interface of the signal processor is connected with the switch, and configured to output an enable signal; and the switch is configured to be controlled by the enable signal to be closed so that the differential signals are output through the connection component. In the electrical interface module according to the embodiment of this disclosure, the switch is configured to be controlled by the enable signal to be closed so that the differential signals output by the signal processor can be output through the connection component; and as compared with the prior art, a test environment can be built using the single module to thereby simplify a testing device in which an office end device can be tested, and the module can be connected directly with the office end device through the connection component, to thereby improve the efficiency of the test.

In an embodiment of this disclosure, a PON can include a Gigabit-Capable Passive Optical Network (GPON) and an Ethernet Passive Optical Network (EPON).

Figure 2:
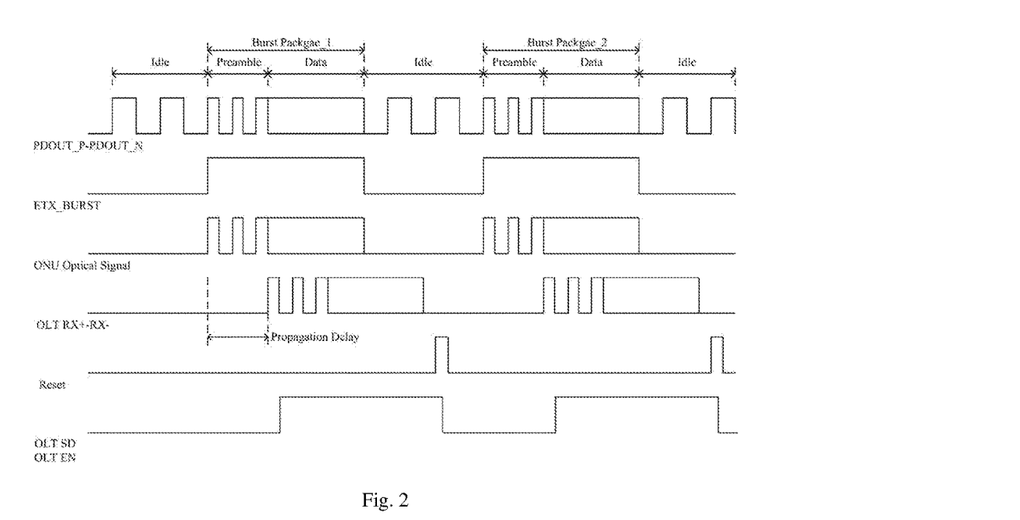
FIG. 2 is a schematic logical timing diagram of an OLT device being tested in the prior art.

During a test, in the uplink, an ONU optical module transmits in a burst mode, and differential signals of an ONU Medium Access Controller (MAC) are output consecutively, where an idle code stream carrying no useful information (data) is transmitted in an idle period of time, and an ETX_BURST port of the ONU MAC controls an ONU laser driver circuit to be enabled, so that the ONU transmits a burst optical signal, where if ETX_BURST is at a high level, for example, if the ONU is activated at a high level, then a laser of the ONU will output laser, and if ETX_BURST is at a low level, then the laser will be disabled by controlling the laser driver circuit so that the laser does not output laser, that is the laser does not respond to the useless idle codes so that the laser does not output laser even if the ONU MAC transmits the idle codes. An OLT receiver operates accordingly so that the OLT receives in a burst mode, and the burst optical signal of the ONU is transmitted to the OLT receiver over long-distance optic fibers, and arrives at the OLT receiver after some delay; and if there is no optical signal to be received, then an output of the OLT receiver will be suppressed (disabled), and if there is an optical signal arriving, then OLT_SD (GPON)/OLT_LOS (EPON) will jump to indicate that there is an optical signal to be received. Taking the GPON as an example, OLT_SD controls the OLT to receive the signal (enable signal (EN) of a limiting amplifier), and SD jumps to a high level so that the limiting amplifier operates normally to receive, amplify, and output the signal; and OLT_SD triggers a Burst Clock Data Recovery (BCDR) to extract a clock and recover data from the received signal, and after all the data are received, the MAC transmits a Reset pulse to reset the OLT_SD signal, and the OLT_SD signal controls a reset circuit between a pre-amplifier and the limiting amplifier to make a coupling capacitance back to an initial stable equilibrium and ready to receive a next burst optical package. FIG. 2 illustrates the operational timing above.

The signal processor can be configured to receive, process, and output the differential signals, and the signal processor can be a MAC. In an embodiment of this disclosure, the signal processor will be replaced with a MAC in the following description.

Figure 3:
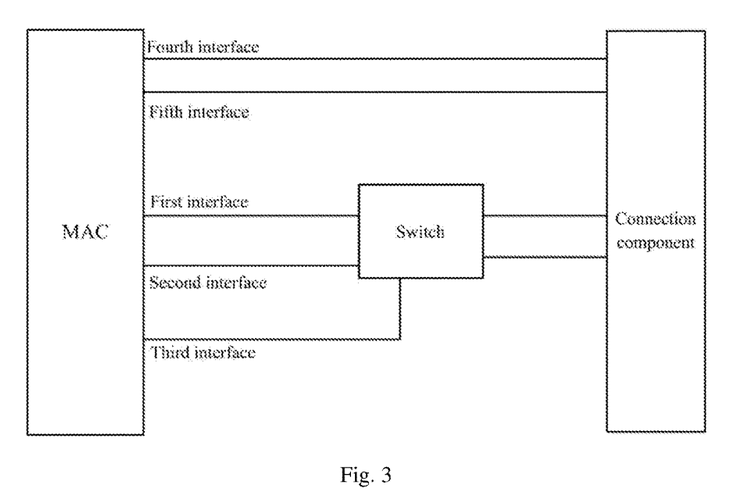
FIG. 3 is a schematic structural diagram of an electrical interface module according to an embodiment of this disclosure.

Further to the description above, FIG. 3 illustrates a structural of an electrical interface module according to an embodiment of this disclosure, which particularly includes:

A MAC, a switch, and a connection component, where the MAC includes a first interface, a second interface, and a third interface, the first interface and the second interface of the MAC are connected with the connection component through the switch, and configured to output differential signals, and the third interface of the MAC is connected with the switch, and configured to transmit an enable signal; and the switch is configured to be controlled by the enable signal to be closed so that the differential signals are output through the connection component.

In an embodiment of this disclosure, the MAC can generate the differential signals, then process the generated differential signals, and finally output the processed differential signals.

In another embodiment, the MAC further includes a fourth interface and a fifth interface, and the fourth interface and the fifth interface of the MAC are connected with the connection component, and configured to receive differential signals. The MAC can alternatively receive the differential signals through the connection component, and thereafter process and output the received differential signals. In an embodiment of this disclosure, the first interface and the second interface of the MAC are output ports, and the fourth interface and the fifth interface of the MAC are input ports.

The connection component can be connected with an OLT device, and the connection component can support hot-plugging. The MAC can be an MAC of the ONU, or can be another MAC which can control processing.

Figure 4:
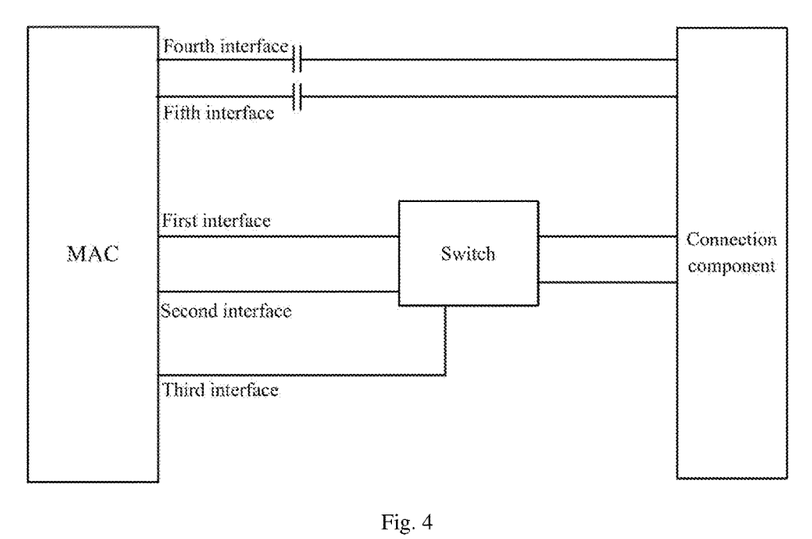
FIG. 4 is a schematic structural diagram of an electrical interface module according to an embodiment of this disclosure.

In an embodiment, during a test on the OLT device, the electrical interface module has functions of the OLT optical module and a user end device integrated together, and a downlink output of the OLT is equivalent to a signal source, where an output port thereof can be connected with receive ports of the ONU through capacitive alternating-current coupling. Particularly as illustrated in FIG. 4, a first capacitor is connected between the fourth interface of the MAC, and the connection component, and a second capacitor is connected between the fifth interface of the MAC, and the connection component, where the fourth interface and the fifth interface of the MAC are receive ports.

Figure 5:
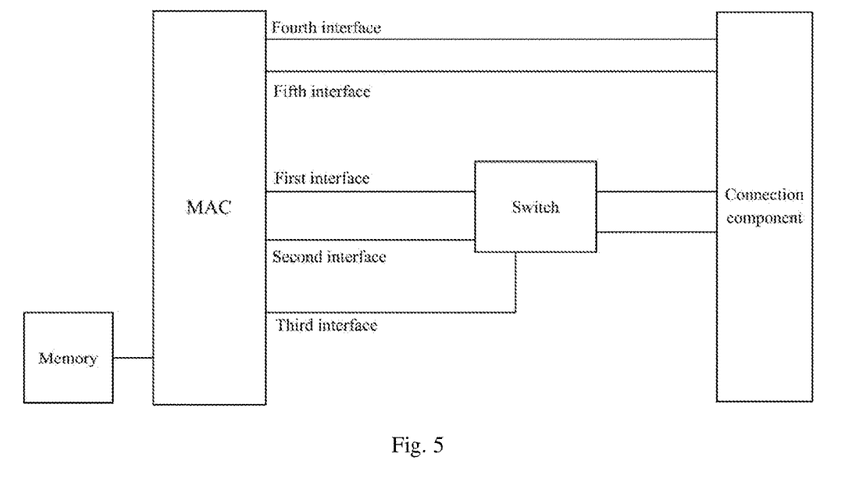
FIG. 5 is a schematic structural diagram of an electrical interface module according to an embodiment of this disclosure.

In an embodiment, the MAC of the ONU buffers the received differential signals transmitted by the OLT in a memory, and as illustrated in FIG. 5, the MAC further includes a memory in which the differential signals received by the MAC are buffered. The differential signals received by the MAC are consecutive differential signals; and the MAC re-packages the buffered differential signals into burst signal packets, where idle timeslots between the packets are filled with idle codes carrying no useful information, and the MAC outputs the burst signal packets through the differential signal output ports, where the packets are output consecutively through the differential signal output ports connected with the connection component through the switch configured to control the signals to be output to the OLT device.

Figure 6:
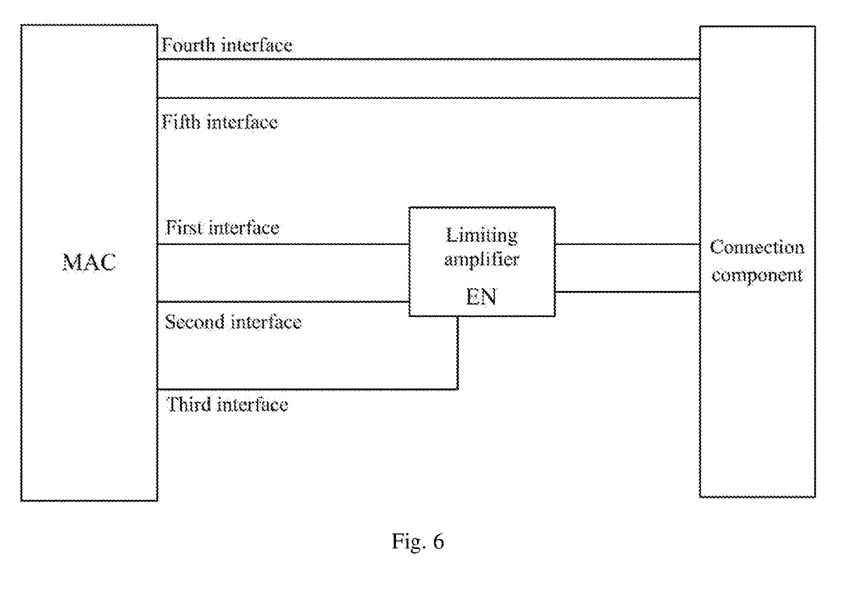
FIG. 6 is a schematic structural diagram of an electrical interface module according to an embodiment of this disclosure.

In an embodiment of this disclosure, the switch can be a limiting amplifier as illustrated in FIG. 6, where an EN port of the limiting amplifier is connected with the third interface of the MAC, and the MAC can transmit an enable signal to the limiting amplifier via the third interface to control the limiting amplifier to output the differential signals processed by the AMC to the OLT device. For example, if the enable signal is at a high level, then the limiting amplifier will output a signal, and if the enable signal is at a low level, then the limiting amplifier will output no signal.

The MAC of the ONU re-packages the signals transmitted by the OLT device into burst signal packets, where idle timeslots between the packets are filled with idle codes carrying no useful information, so the differential signals output through the MAC output ports of the ONU are burst signals. If the enable signal transmitted via the third interface of the MAC is at a high level, then there will be a useful code stream in the differential signals output through the MAC output ports, and if the enable signal transmitted via the third interface of the MAC is at a low level, then there will be an idle code stream carrying no useful information in the differential signals output through the MAC output port. Thus if the enable signal is at a high level, then the limiting amplifier will be controlled to output, so that the limiting amplifier outputs a useful signal; and if the enable signal is at a low level, then the limiting amplifier will be controlled to disable its output, and at this time, the differential signals output through the MAC output port are the idle code stream carrying no useful information, so that the signal output by the limiting amplifier is configured to be controlled by the enable signal transmitted via the third interface of the MAC to switch between active signal and inactive signal.

Figure 7:
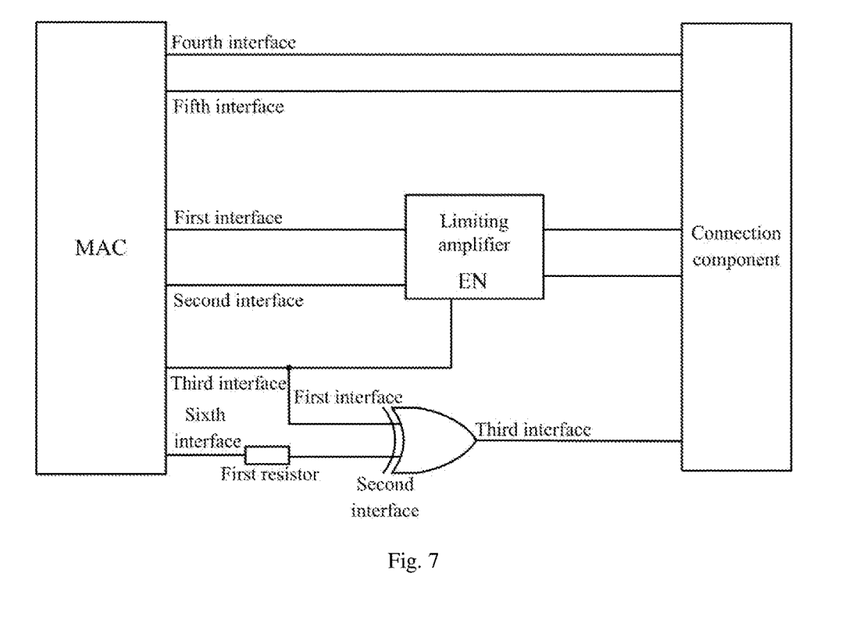
FIG. 7 is a schematic structural diagram of an electrical interface module according to an embodiment of this disclosure.

In a particular implementation, in order to notify the OLT device to receive, the electrical interface module as illustrated in FIG. 7 further includes an XOR logical gate circuit, and the MAC further includes a sixth interface, where the XOR logical gate circuit includes a first interface, a second interface, and a third interface, the first interface and the second interface of the XOR logical gate circuit are input ports, and the third interface thereof is an output port. Here the third interface of the MAC is connected with the first interface of the XOR logical gate circuit, the sixth interface of the MAC is connected with the second interface of the XOR logical gate circuit, the third interface of the XOR logical gate circuit is connected with the connection component, and a first resistor is connected between the sixth interface of the MAC, and the second interface of the XOR logical gate circuit.

For the sake of a compatible test between the GPON and the EPON, the MAC outputs an SD signal or an LOS signal through the XOR logical gate circuit to notify the OLT device to receive a signal. If there is a GPON, then an SD signal will be output via the third interface of the XOR logical gate, and if there is an EPON, an LOS signal will be output via the third interface of the XOR logical gate. The MAC can identify the code stream of the signals transmitted by the OLT device to thereby determine whether the network being tested is a GPON or an EPON. The OLT device can set a flag bit in the transmitted signals so that the MAC of the ONU can determine whether the network being tested is a GPON or an EPON.

If the enable signal transmitted via the third interface of the MAC is at a high level, then there will be a signal being output, and if the MAC determines that an EPON OLT device is being tested, then a high-level signal will be transmitted to the XOR logical gate circuit via the sixth interface of the MAC, so that a low level is output via the third interface of the XOR logical gate circuit, thus outputting an LOS signal (an uplink data reception instruction signal, which is active at a low level); and if the MAC determines that a GPON OLT device is being tested, then a low-level signal will be transmitted to the XOR logical gate circuit via the sixth interface of the MAC, so that a low level is output via the third interface of the XOR logical gate circuit, thus outputting an SD signal (which is active at a high level as opposed to the LOS signal).

Figure 8:
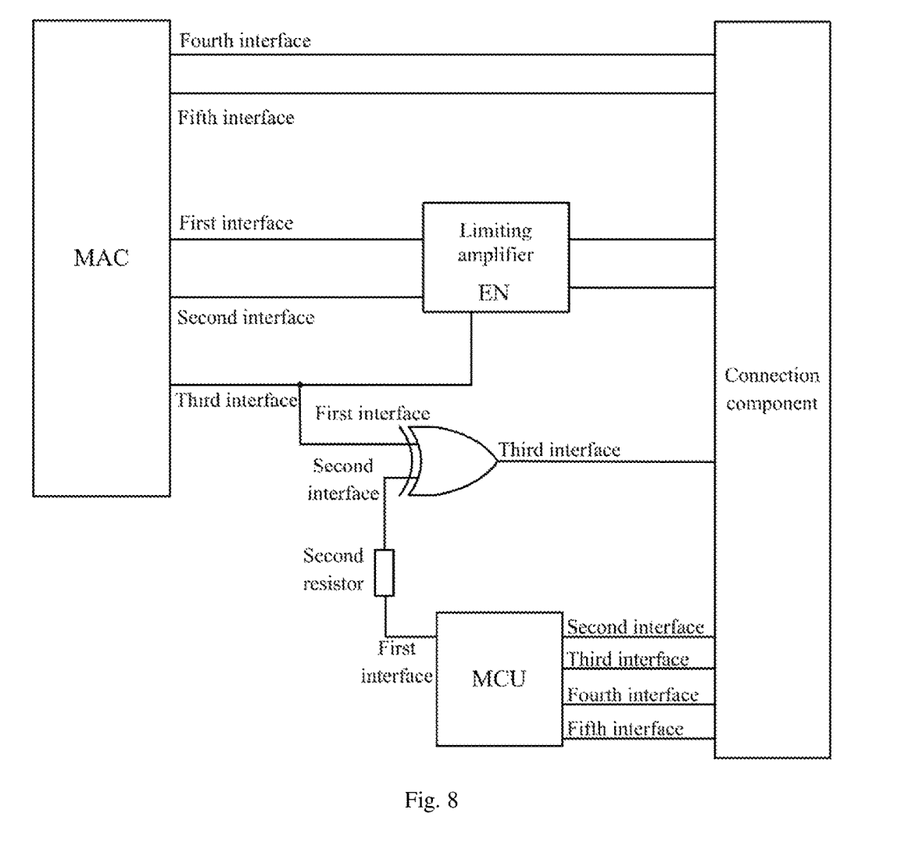
FIG. 8 is a schematic structural diagram of an electrical interface module according to an embodiment of this disclosure.

Correspondingly for the sake of a compatible test between OLT devices of the GPON and the EPON, an embodiment of this disclosure further provides an electrical interface module as illustrated in FIG. 8, where the electrical interface module further includes an XOR logical gate circuit and a Micro Controller Unit (MCU), the XOR logical gate circuit includes a first interface, a second interface, and a third interface, and the MCU includes a first interface; and the third interface of the MAC is connected with the first interface of the XOR logical gate circuit, the first interface of the MAC is an output port and connected with the second interface of the XOR logical gate circuit, the first interface and the second interface of the XOR logical gate circuit are input ports, the third interface thereof is an output port and connected with the connection component, and a second resistor is connected between the first interface of the MCU, and the second interface of the XOR logical gate circuit. The MCU further includes a second interface, a third interface, a fourth interface, and a fifth interface, which are connected respectively with the connection component, where the second interface of the MCU is configured to exchange data, the third interface of the MCU is configured to receive the clock signal, the fourth interface of the MCU is configured to receive the RESET signal transmitted by the OLT device, and the fifth interface of the MCU is configured to receive a TRIGGER signal transmitted by the OLT device.

For the sake of a compatible test between the GPON and the EPON, the MAC outputs an SD signal or an LOS signal through the XOR logical gate circuit to notify the OLT device to receive a signal. If there is a GPON, then an SD signal will be output via the third interface of the XOR logical gate, and if there is an EPON, an LOS signal will be output via the third interface of the XOR logical gate. The OLT device can transmit the corresponding signal to the MCU to notify the MCU whether the network being tested is a GPON or an EPON, so that a corresponding control signal is transmitted via the first interface of the MCU.

If the enable signal transmitted via the third interface of the MAC is at a high level, then there will be a signal being output, and if the MCU determines that an EPON OLT device is being tested, then a high-level signal will be transmitted to the XOR logical gate circuit via the first interface of the MCU, so that a low level signal is output via the third interface of the XOR logical gate circuit, thus an LOS signal is output; and if the MCU determines that a GPON OLT device is being tested, then a high-level signal will be transmitted to the XOR logical gate circuit via the first interface of the MCU, so that a low level signal is output via the third interface of the XOR logical gate circuit, thus an SD signal is output. In this way, the electrical interface module according to the embodiment of this disclosure can test the GPON and EPON OLT devices compatibly to thereby improve the efficiency of the test.

Here the XOR logical gate circuit can alternatively be embodied otherwise, for example, an AND gate, an OR gate, a NOT gate, and other logical circuits can be built together to perform an XOR function.

Figure 9:
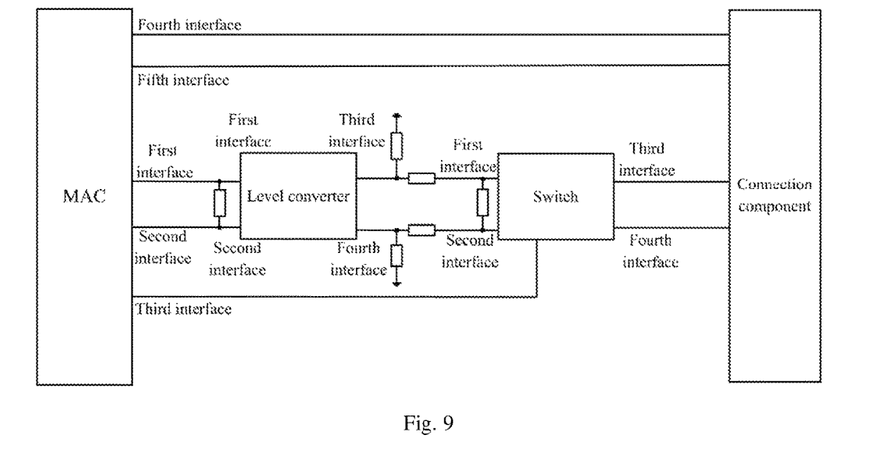
FIG. 9 is a schematic structural diagram of an electrical interface module according to an embodiment of this disclosure.

In order to enable the electrical interface module to output the signals more stably, the electrical interface module as illustrated in FIG. 9 further includes a level converter connected between the first interface and the second interface of the MAC, and the switch. The level converter includes a first interface, a second interface, a third interface, and a fourth interface, and the switch includes a first interface, a second interface, a third interface, and a fourth interface, where the first interface of the MAC is connected with the first interface of the level converter, the second interface of the MAC is connected with the second interface of the level converter, the third interface of the level converter is connected with the first interface of the switch, the fourth interface of the level converter is connected with the second interface of the switch, and the third interface and the fourth interface of the switch are connected respectively with the connection component. The level converter is connected with the output ports of the MAC through direct-current coupling, and configured to convert the levels of the signals output through the MAC output ports into a high-speed level to thereby match them with the high-speed terminal.

A third resistor is connected across the first interface and the second interface of the level converter, a first ground resistor is connected with the third interface of the level converter, a second ground resistor is connected with the fourth interface of the level converter, a fourth resistor is connected between the third interface of the level converter, and the first interface of the switch, a fifth resistor is connected between the fourth interface of the level converter, and the second interface of the switch, and a sixth resistor is connected across the first interface and the second interface of the switch. Current Mode Logic (CML) differential outputs transmitted through the MAC output ports are connected with the level converter through direct-current coupling, and matched with the high-speed terminal through the third resistor; there are Low Voltage Positive Emitter-Couple Logic (LVPECL) levels output by the level converter, and the third interface and the fourth interface of the level converter are grounded respectively through the first ground resistor and the second ground resistor to provide the level converter with a static operating point and a load required for the level converter to operate normally; and the third interface and the fourth interface of the level converter are connected in series respectively with the fourth resistor and the fifth resistor, and connected with the switch through direct-current coupling, and the sixth resistor is connected across the first interface and the second interface of the switch, and since the amplitude of the signals output by the level converter is high, it is divided in voltage by the fourth resistor, the fifth resistor, and the sixth resistor to attenuate appropriately the signals entering the switch so that the switch can well operate stably.

In a real application, either of the two compatible solutions above can be put into use, but the embodiments of this discourse are merely illustrative instead of being limited thereto.

Figure 10:
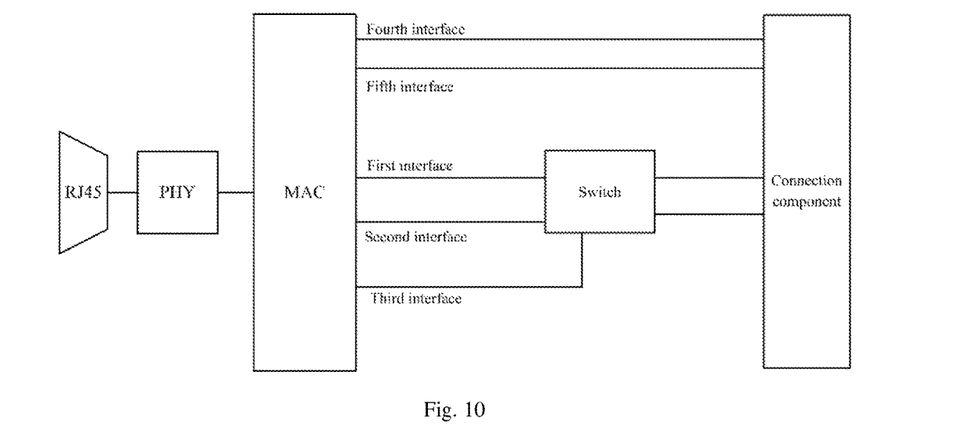
FIG. 10 is a schematic structural diagram of an electrical interface module according to an embodiment of this disclosure.

In order to enable the MAC to be subsequently upgraded in software, the electrical interface module as illustrated in FIG. 10 further includes RJ45 and a PHY chip, where RJ45 is connected with the MAC through the PHY chip, and the MAC is upgraded in software through RJ45.

For the sake of a better description of this disclosure, this disclosure will be described below in connection with a particular application scenario in which the disclosure is put into practice.

Figure 11:
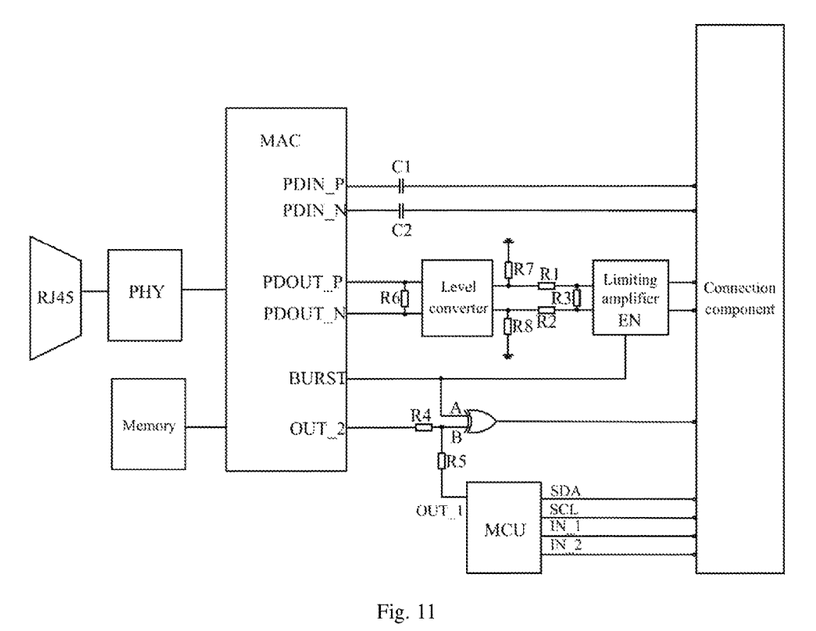
FIG. 11 is a schematic structural diagram of an electrical interface module according to an embodiment of this disclosure.

As illustrated in FIG. 11, the MAC is an MAC of the ONU, the first interface of the MAC is the PDOUT_P port, the second interface thereof is the PDOUT_N port, the third interface thereof is the BURST port, the fourth interface thereof is the PDIN_P port, the fifth interface thereof is the PDIN_N port, and the sixth interface thereof is the OUT_2 port. The first interface of the MCU is the OUT_1 port, the second interface thereof is the SDA port, the third interface thereof is the SCL port, the fourth interface thereof is the IN_1 port, and the fifth interface thereof is the IN_2 port. The first resistor is R4, the second resistor is R5, the third resistor is R6, the fourth resistor is R1, the fifth resistor is R2, the sixth resistor is R3, the first ground resistor is R7, and the second ground resistor is R8. The first capacitor is C1, and the second capacitor is C2.

The electrical interface module particularly includes the MAC, the level converter, the limiting amplifier, the XOR logical gate circuit, the MCU, the PHY chip, the memory, the RJ45, and the connection component.

The capacitor C1 is connected between a PDIN_P port of the MAC, and the connection component, and the capacitor C2 is connected between the PDIN_N port of the MAC, and the connection component.

The resistor R6 is connected between the PDOUT_P port and the PDOUT_N port of the MAC, and the differential output terminals of the level converter are grounded respectively through the resistor R7 and the resistor R8. The differential output terminals of the level converter are connected in series respectively with R1 and R2, and then connected with the limiting amplifier. The resistor R3 is connected the differential input terminals of the limiting amplifier.

The resistor R4 is connected in series between the OUT_2 port of the MAC, and the output terminal B of the XOR logical gate circuit, and the resistor R5 is connected in series between the OUT_1 port of the MCU, and the output terminal B of the XOR logical gate circuit.

The connection component is connected with the OLT device, and a loop is formed through the received and transmitted signals of the ONU MAC. In the downlink, the downlink output of the OLT is equivalent to a signal source, and the output ports thereof are connected with the receive ports of the ONU MAC through alternate-current coupling of the capacitors C1 and C2; and the ONU MAC buffers the received signal in the memory, and the ONU MAC re-packages these data into burst signal packets, where idle timeslots between the packets are filled with idle codes carrying no useful information, and the ONU MAC output the burst signal packets through the uplink output ports thereof.

In the uplink, the ONU MAC outputs uplink signals consecutively, where a high level is output at BURST of the ONU MAC in a period of time in which useful information is output, and a low level is output at BURST thereof in a period of time in which idle codes are output; and BURST is connected with EN of the limiting amplifier, and if a signal received at EN is at a high level, then the limiting amplifier will output a signal; and if a signal received at EN is at a low level, then the limiting amplifier will not output a signal, so although the limiting amplifier receives the consecutive signals, the limiting amplifier outputs burst signals carrying useful information under the effection of BURST, where the burst signals are consisted of preambles and data, and the preambles are configured for BCDR of the OLT device to extract a signal clock.

Taking a GPON OLT device as an example, the OLT SD signal is configured to indicate whether there is a signal to be received by the OLT device. If there is a signal to be received, then SD will jump to a high level, and if there is no signal to be received, then SD will jump to a low level. SD is connected with the Reset pin of BCDR, and if the SD jumps to a high level, then the BCDR will be triggered to extract a clock and to recover data.

If the OLT device is an OLT device in a GPON network, then an SD signal will be output, and if the OLT device is an OLT device in an EPON, then a LOS signal will be output, and in view of opposite phases of SD and LOS, for the sake of compatibility between the EPON and GPON OLT devices, the SD/LOS signal can be output as follows: BURST is connected with one input terminal A of the XOR logical gate circuit, the output port OUT_1 of the MCU is connected with another input terminal B of the XOR logical gate circuit through the resistor R5, and also the output port OUT_2 of the MCU is connected with the input terminal B of the XOR logical gate circuit through the resistor R4. In a real application, the sixth interface of the MAC controls the XOR logical gate circuit to output the SD/LOS signal, or the first interface of the MCU controls the XOR logical gate circuit to output the SD/LOS signal.

There are two implementations of signal control at the input terminal B of the XOR logical gate circuit, where in one of the implementations, the ONU MAC identify automatically the EPON or GPON OLT device from the code stream of the signals to thereby output a corresponding control signal; and in the other implementation, the EPON or GPON OLT device controls the MCU over a bus so that a corresponding control signal is output at OUT_1 of the MCU.

Figure 12:
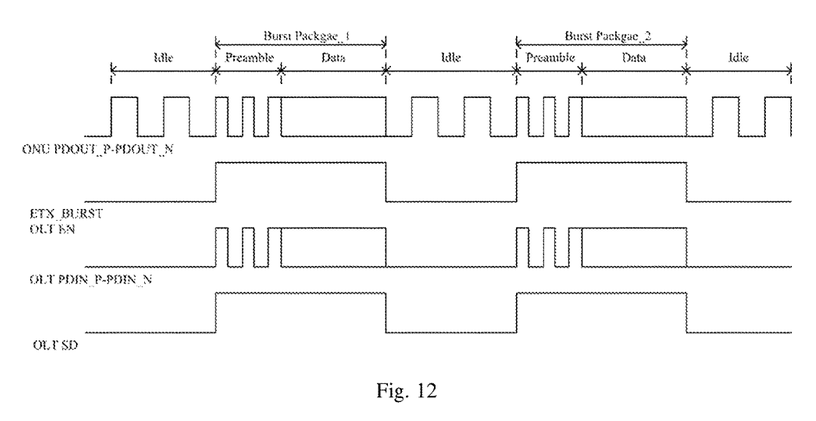
FIG. 12 is a schematic logical timing diagram of a GPON OLT device being tested according to an embodiment of this disclosure.
Figure 13:
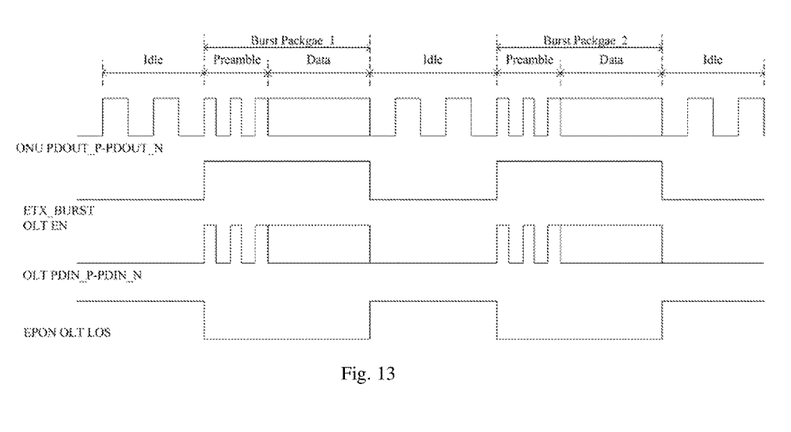
FIG. 13 is a schematic logical timing diagram of an EPON OLT device being tested according to an embodiment of this disclosure.

If a high level is output at the BURST port, then there will be a signal to be output, and if the EPON OLT device is being tested, then the output terminal B of the XOR logical gate circuit will be set to the logical level of 1, so that the LOS signal is output; and if the GPON OLT device is being tested, then the output terminal B of the XOR logical gate circuit will be set to the logical level of 0, so that the SD signal is output. Particularly FIG. 12 and FIG. 13 illustrate timing diagrams of logical signals in the electrical interface module.

The signal output ports of the OLT device are connected with the signal receive ports of the ONU MAC through alternate-current coupling, and the OLT device broadcasts data consecutively to the ONU MAC, where the consecutive data are processed by the ONU MAC and then converted into discrete burst signals transmitted to the receive ports of the OLT device through the output ports of the ONU MAC, thus resulting in a loop of the signals for testing traffic flow of the data.

The data transmit terminals of the ONU MAC, which are CML differential outputs, are connected with the level converter through direct-current coupling, and matched with the high-speed terminal through 100-ohm resistors; the level converter outputs the differential LVPECL levels grounded respectively through 150-ohm resistors to provide the level converter with the static operating point and the load required for the level converter to operate normally; the differential outputs are connected in series respectively with the resistors R1 and R2, and connected with the limiting amplifier through direct-current coupling, and since the amplitude of the signals output by the level converter is high, it is divided in voltage by R1 and R2 respectively together with R3 to attenuate appropriately the signals entering the limiting amplifier so that the limiting amplifier can well operate stably; and the output terminal of the limiting amplifier is connected with the OLT device through direct-current coupling.

In summary, an embodiment of this disclosure provides an electrical interface module including an MAC, a switch, and a connection component, where the MAC includes a first interface, a second interface, and a third interface, the first interface and the second interface of the MAC are connected with the connection component through the switch, and configured to output differential signals, and the third interface of the signal MAC is connected with the switch, and configured to transmit an enable signal; the MAC processes the differential signals, and then outputs the processed differential signals at differential output terminals of the MAC; and the enable signal is transmitted via the third interface of the MAC to control the switch to be closed so that the processed differential signals are output through the connection component. In the embodiment of this disclosure, the MAC receives the differential signals, and then processes and further outputs the differential signals. Moreover the electrical interface module according to the embodiment of this disclosure can be simplified in structure, can test an OLT device, and can be connected directly with the OLT device through the connection component, thus improving the efficiency of the test.

In an embodiment of this disclosure, the electrical interface module can be SFP-packaged, and for the sake of compatibility between a GPON and an EPON, the connection component is newly defined in the embodiment of this disclosure, particularly as depicted in Table 1.

TABLE 1

Descriptions of pins of connection component

| Pins | Names | Descriptions | Notes |
|---|---|---|---|
| 1 | $V_{EET}$ | Transmitting ground | |
| 2 | $V_{EET}$ | Transmitting ground | |
| 3 | Tx_DIS | Transmitting disabled | Optical module pulled up internally, and the state thereof monitored by MCU |
| 4 | MOD_DEF 2 | 2-line serial interface data lines | |
| 5 | MOD_DEF 1 | 2-line serial interface clock lines | |
| 6 | MOD_DEF 1 | Receiving ground | |
| 7 | Rx_RESET/NC | Reset pin of GPON OLT; and NC (floating) for EPON OLT | Compatible design |
| 8 | Rx_SD/LOS | Received signal loss indicator (SD signal output for GPON OLT, and LOS signal output for EPON OLT) | Compatible design, where a high level indicates an optical signal (GPON); and a low level indicates an optical signal (EPON) |
| 9 | RSSI_T RI/$V_{EER}$ | Received signal strength trigger (GPON OLT); and receiving ground (EPON OLT) | Compatible design, where a GPON optical module is pulled down internally, and a high level causes an RSSI trigger mode to be entered |
| 10 | $V_{EER}$ | Receiving ground | |
| 11 | $V_{EER}$ | Receiving ground | |
| 12 | RD− | Receive negative | Internal DC coupling |
| 13 | RD+ | Receive positive | Internal DC coupling |
| 14 | $V_{EER}$ | Receiving ground | |
| 15 | $V_{CCR}$ | Receive power source | 3.3 V +/− 5% |
| 16 | $V_{CCT}$ | Transmit power source | 3.3 V +/− 5% |
| 17 | $V_{EET}$ | Transmitting ground | |
| 18 | TD+ | Transmit positive | Internal AC coupling |
| 19 | TD− | Transmit positive | Internal AC coupling |
| 20 | $V_{EET}$ | Transmitting ground | |

During a test on an access network office end device, the electrical interface module according to the embodiment of this disclosure can be connected with an LOT line card in the OLT device through the connection component in the electrical interface module, and then a traffic flow meter can be controlled by a computer to test the OLT device.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An electrical interface module, connectable to an Optical Line Terminal (OLT) device, comprising a signal processor, a switch, and a connection component, wherein:
   the signal processor comprises a first interface, a second interface, and a third interface;
   the first interface and the second interface of the signal processor are connected with the connection component through the switch, and configured to output differential signals processed by the signal processor;
   the third interface of the signal processor is connected with the switch, and configured to output an enable signal; and
   the switch is configured to be controlled by the enable signal to be conductive to enable the processed differential signals to be transmitted to the connection component so that the processed differential signals are output through the connection component.

2. The electrical interface module according to claim 1, wherein the switch is a limiting amplifier, and the signal processor is a Medium Access Controller (MAC); and
   the third interface of the MAC is connected with an enable (EN) port of the limiting amplifier, and configured to transmit an enable signal to the limiting amplifier to control the limiting amplifier to output the processed differential signals.

3. The electrical interface module according to claim 1, further comprising an XOR logical gate circuit, wherein:
   the signal processor further comprises a sixth interface;
   the XOR logical gate circuit comprises a first interface, a second interface, and a third interface;
   the third interface of the signal processor is connected with the first interface of the XOR logical gate circuit;
   the sixth interface of the signal processor is connected with the second interface of the XOR logical gate circuit;
   the third interface of the XOR logical gate circuit is connected with the connection component; and
   the signal processor outputs an SD signal or an LOS signal through the XOR logical gate circuit.

4. The electrical interface module according to claim 3, wherein a first resistor is connected between the sixth interface of the signal processor, and the second interface of the XOR logical gate circuit.

5. The electrical interface module according to claim 1, further comprising an XOR logical gate circuit and a Micro Controller Unit (MCU), wherein:
   the XOR logical gate circuit comprises a first interface, a second interface, and a third interface;
   the MCU comprises a first interface;
   the third interface of the signal processor is connected with the first interface of the XOR logical gate circuit;
   the first interface of the MCU is connected with the second interface of the XOR logical gate circuit;
   the third interface of the XOR logical gate circuit is connected with the connection component; and
   the MCU outputs an SD signal or an LOS signal through the XOR logical gate circuit.

6. The electrical interface module according to claim 5, wherein a second resistor is connected between the first interface of the MCU, and the second interface of the XOR logical gate circuit.

7. The electrical interface module according to claim 5, wherein the MCU further comprises a second interface, a third interface, a fourth interface, and a fifth interface; and
   the second interface of the MCU, the third interface of the MCU, the fourth interface of the MCU, and the fifth interface of the MCU are connected respectively with the connection component.

8. The electrical interface module according to claim 2, further comprising a level converter, wherein:
   the level converter comprises a first interface, a second interface, a third interface, and a fourth interface;
   the limiting amplifier comprises a first interface, a second interface, a third interface, and a fourth interface;
   the first interface of the signal processor is connected with the first interface of the level converter, and the second interface of the signal processor is connected with the second interface of the level converter;
   the third interface of the level converter is connected with the first interface of the limiting amplifier;
   the fourth interface of the level converter is connected with the second interface of the limiting amplifier;
   the third interface and the fourth interface of the limiting amplifier are connected respectively with the connection component; and
   the level converter is configured to convert levels of the signal output by the signal processor into levels receivable by the limiting amplifier.

9. The electrical interface module according to claim 8, wherein a third resistor is connected between the first interface and the second interface of the level converter;
   a first ground resistor is connected with the third interface of the level converter, and a second ground resistor is connected with the fourth interface of the level converter;
   a fourth resistor is connected between the third interface of the level converter, and the first interface of the limiting amplifier, and a fifth resistor is connected between the fourth interface of the level converter, and the second interface of the limiting amplifier; and
   a sixth resistor is connected between the first interface and the second interface of the limiting amplifier.

10. The electrical interface module according to claim 1, wherein the signal processor further comprises a fourth interface and a fifth interface;
    the fourth interface and the fifth interface of the signal processor are connected with the connection component, and configured to receive differential signals from the OLT device; and
    a first capacitor is connected between the fourth interface of the signal processor, and the connection component, and a second capacitor is connected between the fifth interface of the signal processor, and the connection component.

11. The electrical interface module according to claim 1, wherein the electrical interface module is connected to the OLT device through the connection component, and the connection component is configured to output the processed differential signals to the OLT device.

12. The electrical interface module according to claim 1, wherein the electrical interface module is all electrical.

13. The electrical interface module according to claim 1, wherein the electrical interface module does not involve processing of an optical signal.

* * * * *